(12) United States Patent
Christman et al.

(10) Patent No.: US 6,945,727 B2
(45) Date of Patent: Sep. 20, 2005

(54) APPARATUSES AND METHODS FOR JOINING STRUCTURAL MEMBERS, SUCH AS COMPOSITE STRUCTURAL MEMBERS

(75) Inventors: David B. Christman, Ravensdale, WA (US); William G. Roeseler, Kirkland, WA (US)

(73) Assignee: The Boeing Company, Seattle, WA (US)

( * ) Notice: Subject to any disclaimer, the term of this patent is extended or adjusted under 35 U.S.C. 154(b) by 10 days.

(21) Appl. No.: 10/199,214

(22) Filed: Jul. 19, 2002

(65) Prior Publication Data

US 2004/0011927 A1 Jan. 22, 2004

(51) Int. Cl.⁷ .............................. F16B 7/10; B64C 1/12
(52) U.S. Cl. ................... 403/109.8; 403/170; 403/186; 403/265; 403/267; 403/329; 244/132
(58) Field of Search .......................... 403/109.3, 109.8, 403/169, 170, 186, 187, 190, 191, 202, 263, 265–268, 233, 292, 329, 397; 52/586.2, 582.1, 582.2, 729.2; 244/131, 132, 133

(56) References Cited

U.S. PATENT DOCUMENTS

| | | | | |
|---|---|---|---|---|
| 2,116,953 A | * | 5/1938 | Sambraus | 244/131 |
| 5,102,253 A | * | 4/1992 | Pugliesi-Conti et al. | |
| 5,476,704 A | * | 12/1995 | Kohler | 52/729.2 |
| 5,577,353 A | * | 11/1996 | Simpson | 403/170 |
| 5,738,477 A | * | 4/1998 | McCorkle et al. | 411/509 |
| 6,374,570 B1 | * | 4/2002 | McKague, Jr. | 52/762 |
| 6,520,706 B1 | * | 2/2003 | McKague et al. | 403/265 |
| 2002/0053175 A1 | * | 5/2002 | McKague et al. | |

FOREIGN PATENT DOCUMENTS

| | | |
|---|---|---|
| DE | 3422973 A1 | 2/1985 |
| EP | 0257148 A1 | 3/1988 |
| EP | 0971136 A1 | 1/2000 |
| GB | 1081423 | 8/1967 |

\* cited by examiner

*Primary Examiner*—Thomas B. Will
*Assistant Examiner*—Victor MacArthur
(74) *Attorney, Agent, or Firm*—Perkins Coie LLP

(57) ABSTRACT

Apparatuses and methods for joining structural members. In one embodiment, an apparatus for joining a first member to a second member includes a first part and a second part configured to be engaged with and bonded to the first part. In one aspect of this embodiment, the first part includes a first surface facing a first direction, a second surface facing a second direction different than the first direction, a first recess at least proximate to the first surface, and a second recess at least proximate to the second surface. In another aspect of this embodiment, the second part includes a third surface facing a third direction, a fourth surface facing a fourth direction different than the third direction, a first protuberance at least proximate to the third surface, and a second protuberance at least proximate to the fourth surface. In yet another aspect of this embodiment, the first protuberance is configured to be received by the first recess, and the second protuberance is configured to be received by the second recess, when the second part is engaged with the first part to join the structural members.

33 Claims, 9 Drawing Sheets

APPARATUSES AND METHODS FOR JOINING STRUCTURAL MEMBERS, SUCH AS COMPOSITE STRUCTURAL MEMBERS

TECHNICAL FIELD

The following disclosure relates generally to apparatuses for joining structural members and, more particularly, to apparatuses and methods for joining composite structural members, such as for use in aircraft structures.

BACKGROUND

Composite materials, such as graphite-epoxy, have been used in the manufacture of aircraft structures for many years because they have high strength-to-weight ratios. Initially, only lightly loaded or non-critical parts were manufactured from composite materials. As the technology advanced, however, a greater percentage of aircraft parts, including critical structural members, were manufactured from composite materials.

In contrast to metallic materials which are typically joined using fasteners such as bolts or rivets, composite materials are typically joined using adhesives. As a result, elaborate tooling is often required during the assembly of composite parts to hold the parts in their respective positions while the adhesive cures. The costs associated with this tooling can be substantial for large aircraft structures that must be accurately positioned.

FIG. 1 illustrates a prior art joining apparatus 110 for joining a wing rib panel 102 to a wing skin panel 101. The joining apparatus 110 includes a base 112 and first and second flanges 114 and 116, respectively, projecting outwardly from the base 112 to form a gap 115. The wing rib panel 102 has a thickness 117 and is positioned in the gap 115 between the first and second flanges 114 and 116. The wing rib panel 102 is bonded to the joining apparatus 110 with a generous amount of adhesive 118. The wing skin panel 101 is positioned adjacent to the outer surface of the base 112, and is bonded to the joining apparatus 110 with a layer of adhesive.

As shown in FIG. 1, the gap 115 is significantly wider than the wing rib thickness 117 to provide a considerable clearance between the wing rib panel 102 and the joining apparatus 110. This clearance is provided for a number of reasons. One reason is to prevent the adhesive 118 from being scraped off of the sides of the wing rib panel 102 as the wing rib panel 102 is inserted into the gap 115 during assembly. Another reason is to provide a path for excess adhesive 118 to escape as the wing rib panel 102 is inserted into the gap 115. Without this escape path, it may be difficult to fully insert the wing rib panel 102 into the gap 115 when the gap 115 is filled with the adhesive 118. Because of the large clearance between the wing rib panel 102 and the gap 115, tooling (not shown) is generally required to hold the wing rib panel 102 in the correct position relative to the wing skin panel 101 while the adhesive 118 cures.

There are a number of shortcomings associated with the joining apparatus 110 described above. For example, one shortcoming is the complex tooling that may be required when the joining apparatus 110 is utilized on large structures, such as aircraft wings having multiple wing rib panels 102 bonded to the wing skin panel 101. Such tooling may include, for example, multiple sub-fixtures, each configured to hold an individual wing rib panel 102 in its correct position relative to the wing skin panel 101. As mentioned above, the costs associated with this tooling can be substantial.

Another shortcoming of the joining apparatus 110 is the lack of bond pressure exerted on the adhesive 118 between the wing rib panel 102 and the first and second flanges 114 and 116 during curing, as a result of the oversized gap 115. Bond pressure can be a significant factor in developing sufficient bond-line strength. Accordingly, the bond-line that develops between the wing rib panel 102 and the joining apparatus 110 may not be as strong as it could be had sufficient bond pressure been applied. As a result, a design utilizing the joining apparatus 110 may have to provide more bond area than would otherwise be required to adequately join the wing rib panel 102 to the wing skin panel 101. This additional bond area can increase airframe weight and/or decrease aircraft performance.

SUMMARY

The present invention is directed to apparatuses and methods for joining structural members. In one aspect of the invention, an apparatus for joining a first member to a second member includes a first part and a second part configured to be engaged with and bonded to the first part. The first part can include a first surface facing a first direction and a second surface facing a second direction different than the first direction. The first part can further include a first recess at least proximate to the first surface and a second recess at least proximate to the second surface. The second part can include a third surface facing a third direction and a fourth surface facing a fourth direction different than the third direction. The second part can further include a first protuberance at least proximate to the third surface and a second protuberance at least proximate to the fourth surface. In another aspect of the invention, the third surface is configured to receive adhesive for bonding the third surface to the first surface, the fourth surface is configured to receive adhesive for bonding the fourth surface to the second surface, the first protuberance is configured to be received by the first recess, and the second protuberance is configured to be received by the second recess, when the second part is engaged with the first part.

In another aspect of the invention, the first part of the joining apparatus can include a first base portion and first and second flange portions projecting from the first base portion. The first flange portion can include the first surface, the second flange portion can include the second surface, and the first base portion can include a fifth surface configured for attachment to the first member. In another aspect of the invention, the second part of the joining apparatus can include a second base portion and third and fourth flange portions projecting from the second base portion. The third flange portion can include the third surface, the fourth flange portion can include the fourth surface, and the second base portion can include a sixth surface configured for attachment to the second member.

In yet another aspect of the invention, a method for joining a first member to a second member includes providing a first part having a first surface facing a first direction and a second surface facing a second direction different than the first direction. The first part can further have a first recess at least proximate to the first surface and a second recess at least proximate to the second surface. The method can further include providing a second part having a third surface facing a third direction and a fourth surface facing a fourth direction different than the third direction. The second part can further have a first protuberance at least proximate to the third surface and a second protuberance at least proximate to the fourth surface. In yet another aspect of the invention, the method can further include applying adhesive to the third and fourth surfaces of the second part, engaging the first protuberance of the second part with the first recess of the first part, and engaging the second protuberance of the second part with the second recess of the first part.

DETAILED DESCRIPTION

Figure 1:
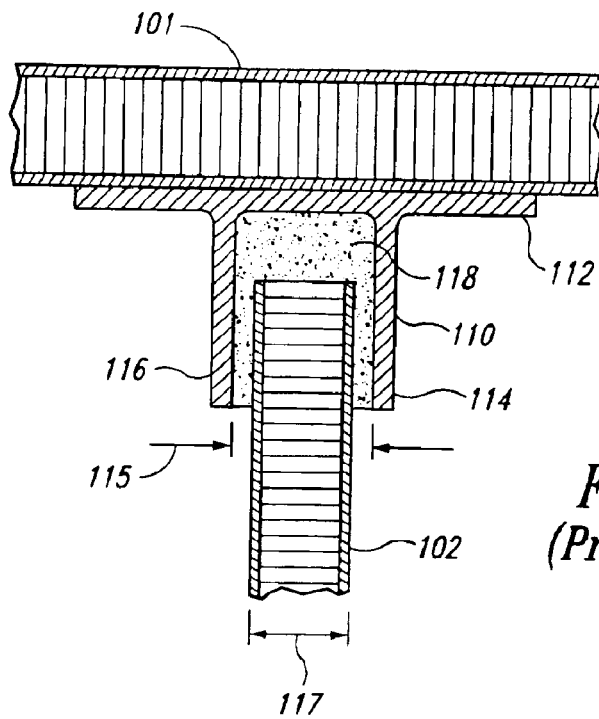
FIG. 1 illustrates an apparatus for attaching a wing rib panel to a wing skin panel in accordance with the prior art.

The following disclosure describes apparatuses and methods for joining structural members, such as composite structural members used in aircraft structures. Certain specific details are set forth in the following description and in the FIGS. 2–12 to provide a thorough understanding of various embodiments of the invention. Those of ordinary skill in the relevant art will understand, however, that the present invention may have additional embodiments which may be practiced without several of the details described below. In addition, well-known structures and systems often associated with aircraft and aircraft structures have not been shown or described in detail below to avoid unnecessarily obscuring the description of the various embodiments of the invention.

In the drawings, identical reference numbers identify identical or generally similar elements. To facilitate the discussion of any particular element, the most significant digit or digits in any reference number refers to the figure in which that element is first introduced. For example, element 202 is first introduced and discussed in reference to FIG. 2. In addition, any dimensions, angles and other specifications shown in the figures are merely illustrative of particular embodiments of the invention. Accordingly, other embodiments of the invention can have other dimensions, angles and specifications without departing from the spirit or scope of the present invention.

Figure 2:
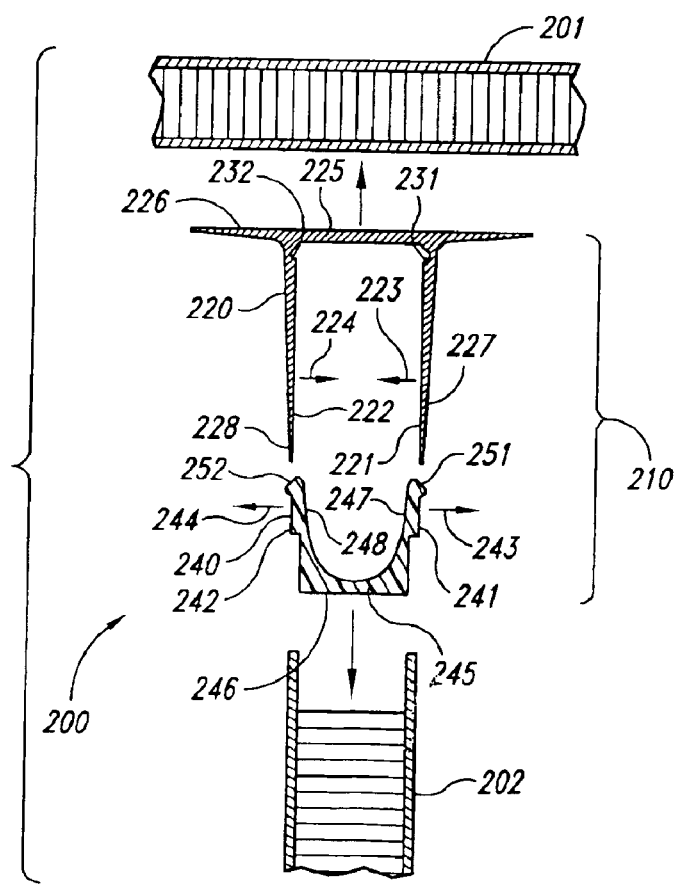
FIG. 2 is an exploded cross-sectional view of a structural assembly having a joining apparatus for attaching a first member to a second member in accordance with an embodiment of the invention.

FIG. 2 is an exploded cross-sectional view of a structural assembly 200 having a joining apparatus 210 for attaching a first member 201 to a second member 202 in accordance with an embodiment of the invention. In one aspect of this embodiment, the joining apparatus 210 includes a first part 220 and a second part 240 configured to engage the first part 220. The first part 220 includes a first base portion 225 and first and second flange portions 227 and 228, respectively, projecting outwardly from the first base portion 225. The first base portion 225 includes a first base surface 226 configured to receive adhesive (not shown) for bonding the first part 220 to the first member 201. The first flange portion 227 includes a first surface 221 facing a first direction 223, and the second flange portion 228 includes a second surface 222 facing a second direction 224 different from the first direction 223. In another aspect of this embodiment, the first and second surfaces 221 and 222 are positioned at angles of from about 85 degrees to about 90 degrees relative to the first base surface 226. In other embodiments, these surfaces can be positioned at other relative angles.

In another aspect of this embodiment, the first part 220 further includes a first recess 231 at least proximate to the first surface 221, and a second recess 232 at least proximate to the second surface 222. In the illustrated embodiment, the first recess 231 is positioned between the first flange portion 227 and the first base portion 225, and the second recess 232 is positioned between the second flange portion 228 and the first base portion 225. In other embodiments, the first and second recesses 231 and 232 can have other positions. In yet another aspect of this embodiment, the first and second flange portions 227 and 228 can be tapered and/or angled and/or curved as they project outwardly from the first base portion 225 to provide a desired amount of elasticity. As will be explained in greater detail below, this elasticity can be tailored to provide a desirable amount of pressure between the mating surfaces of the first part 220 and the adjacent surfaces of the second part 240 and the second member 202 when these parts are bonded together.

In the illustrated embodiment, the second part 240 includes a second base portion 245 and third and fourth flange portions 247 and 248, respectively, projecting outwardly from the second base portion 245. The second base portion 245 includes at least one second base surface 246 configured to receive adhesive (not shown) for bonding the second part 240 to the second member 202. In one aspect of this embodiment, the third flange portion 247 includes a third surface 241 facing a third direction 243, and the fourth flange portion 248 includes a fourth surface 242 facing a fourth direction 244 different from the third direction 243. In another aspect of this embodiment, the second part 240 further includes a first protuberance 251 at least proximate to the third surface 241, and a second protuberance 252 at least proximate to the fourth surface 242. As will also be described in further detail below, the first protuberance 251 is configured to be received by the first recess 231, and the second protuberance 252 is configured to be received by the second recess 232, when the second part 240 is fully engaged with the first part 220.

A number of different materials and manufacturing methods can be used to manufacture the first part 220 and the second part 240 in accordance with embodiments of the present invention. For example, in one embodiment these parts can be manufactured from composite materials, such as graphite-epoxy, using a pulltrusion manufacturing method. In another embodiment, these parts can be manufactured from composite materials using a presstrusion manufacturing method. Although the foregoing options involve composite materials, in other embodiments the first part 220 and the second part 240 can be manufactured using other materials and/or other manufacturing methods. For example, in one other embodiment, the first and second parts 220 and 240 can be manufactured from metallic materials using one or more conventional metal-forming techniques. In yet other embodiments, other materials and other manufacturing methods can be used to form the first part 220 and the second part 240.

In an embodiment illustrated in FIG. 2, the first member 201 is a first composite member, such as a wing skin panel, and the second member 202 is a second composite member, such as a wing rib panel. In one aspect of this embodiment, the first member 201 and the second member 202 are sandwich panels having laminated facesheets spaced apart by honeycomb cores. In other embodiments, other types of composite materials can be used. In yet other embodiments, the first and second members 201 and 202 can be manufactured from other materials, such as metallic materials. In still other embodiments, the first and second members 201 and 202 can be other types of structures. For example, in one other embodiment the first member 201 can be a wing skin panel and the second member 202 can be a strut member.

Figure 3A:
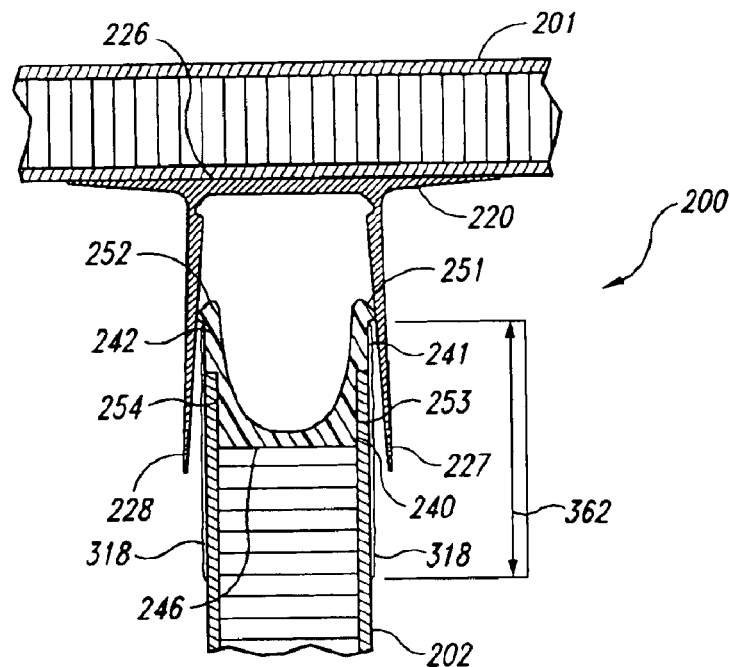
FIGS. 3A and 3B are cross-sectional views of the structural assembly of FIG. 2 illustrating the joining apparatus in partially and fully engaged positions, respectively, in accordance with embodiments of the invention.
Figure 3B:
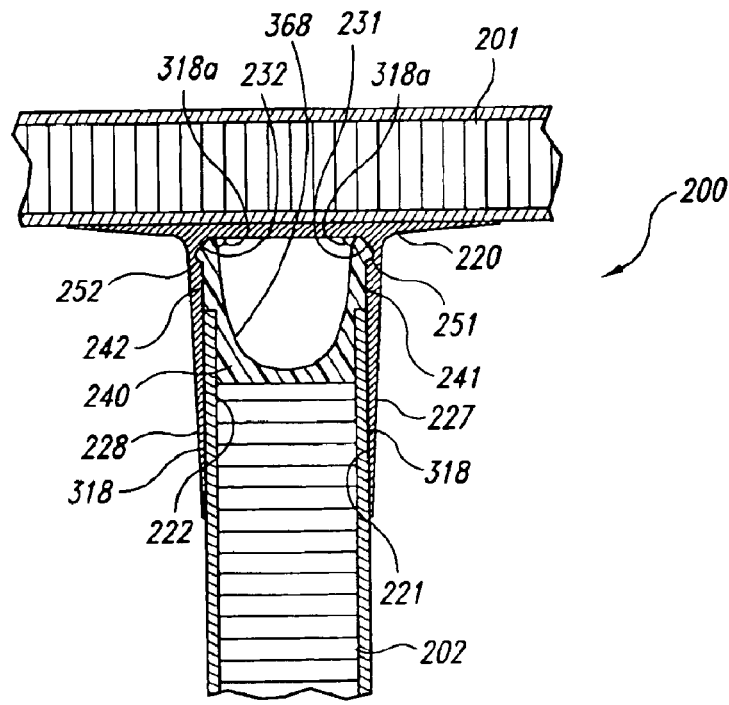

FIGS. 3A and 3B are cross-sectional views of the structural assembly 200 of FIG. 2 illustrating the first and second parts 220 and 240 in partially and fully engaged positions, respectively, in accordance with embodiments of the invention. In one aspect of this embodiment (shown in FIG. 3A), adhesive 318 is applied to the third surface 241, the fourth surface 242, and adjacent portions of the second member 202 over a bond distance 362 before the second part 240 is engaged with the first part 220. The bond distance 362 can be at least approximately equal to the lengths of the first and second flange portions 227 and 228 to ensure sufficient adhesive coverage between mating surfaces when the first and second parts 220 and 240 are fully engaged.

When the second part 240 is partially inserted between the first and second flange portions 227 and 228 of the first part 240 as shown in FIG. 3A, the first and second protuberances 251 and 252 force the first and second flange portions 227 and 228 outward, preventing or at least restricting the first and second flange portions 227 and 228 from scraping the adhesive off of the third and fourth surfaces 241 and 242 and the adjacent portions of the second member 202 as the second part 240 is inserted into the first part 220. An advantage of this feature is that it increases (relative to conventional arrangements) the amount of adhesive present between the first surface 221 and the second member 202, and between the second surface 222 and the second member 202, to form a stronger bond between the first part 220 and the second member 202 when they are fully engaged, as described below with reference to FIG. 3B.

Referring now to FIG. 3B, when the second part 240 is fully engaged with the first part 220, the first protuberance 251 is received in the first recess 231, and the second protuberance 252 is received in the second recess 232. Engaging the first and second parts 220 and 240 in this manner allows the first and second flange portions 227 and 228 of the first part 220 to snap inwardly and effectively sandwich the second part 240 and the second member 202. Accordingly, the flange portions 227 and 228 can apply pressure to the adhesive 318 on the second member 202 (and on the third and fourth surfaces 241 and 242) as the adhesive 318 cures to develop the full bond strength of the adhesive 318. In addition, engaging the first and second parts 220 and 240 in this manner also provides a locating feature that holds the second member 202 in its final position relative to the first member 201 while the adhesive 318 cures, obviating the need for additional assembly tooling.

The structural assembly 200 can be assembled in a number of different sequences in accordance with embodiments of the present invention. For example, in one embodiment, the first part 220 can be bonded to the first member 201, and the second part 240 can be bonded to the second member 202, at the sub-assembly stage before the second part 240 is engaged with the first part 220. In this embodiment, the first part 220 is bonded to the first member 201 with adhesive 318 applied to the first base surface 226, and the second part 240 is bonded to the second member 202 with adhesive 318 applied to the second base surface 246 and adjacent portions of the third and fourth flanges 247 and 248. Pre-bonding the first and second parts 220 and 240 to the first and second members 201 and 202, respectively, in this manner results in the second member 202 being "self-indexed" relative to the first member 201 when the second part 240 is engaged with the first part 220. That is, the relative positions of the first and second members 201 and 202 are automatically established without the use of tooling as a result of the close fit between the first part 220 and the second part 240.

In other embodiments, other assembly sequences can be used. For example, in one other embodiment, the second part 240 can be bonded to the second member 202, and the first part 220 can then be engaged with and bonded to the second part 240, before the first member 201 is bonded to the first part 220. In this particular embodiment, the final position of the first member 201 can be adjusted before the first member 201 is bonded to the first base surface 226 of the first part 240. Such adjustment may be advantageous for certain structural assemblies where there are multiple second members 202 being attached to a single first member 201. In yet other embodiments, other assembly sequences can be used.

There are a number of advantages associated with embodiments of the present invention. One advantage is the self-indexing feature discussed above. For example, in contrast to conventional composite joining apparatuses that require assembly tooling to accurately position parts while the joining adhesive cures, the first and second parts 220 and 240 of the present invention can automatically position the second member 202 relative to the first member 201 when the first and second parts 220 and 240 are engaged, as described above. Another advantage is the bond-line pressure that can be provided by the elasticity of the first and second flange portions 227 and 228. In contrast to conventional composite joining apparatuses, such as that shown in FIG. 1, where oversize gaps reduce bond-line pressure, the first and second flange portions 227 and 228 can be shaped and sized to elastically exert bond-line pressure at a desired level to increase bond-line strength. Increased bond-line strength can allow the adjacent structures to be efficiently sized, resulting in lower airframe weight and increased performance.

Yet another advantage associated with embodiments of the present invention is that the first part 220 and the second part 240 are configured so that the second part 240 can be inserted into the first part 220 without scraping or otherwise displacing the adhesive 318 from the second part 240. This feature is provided by the first and second protuberances 251 and 252 which spread the first and second flange portions 227 and 228 outwardly away from the applied adhesive 318. In addition, if some adhesive (such as adhesive 318a shown in FIG. 3B) squeezes out of the bond-lines between the first part 220 and the second part 240 during engagement, this adhesive can be collected in a catch basin 368.

Figure 4A:
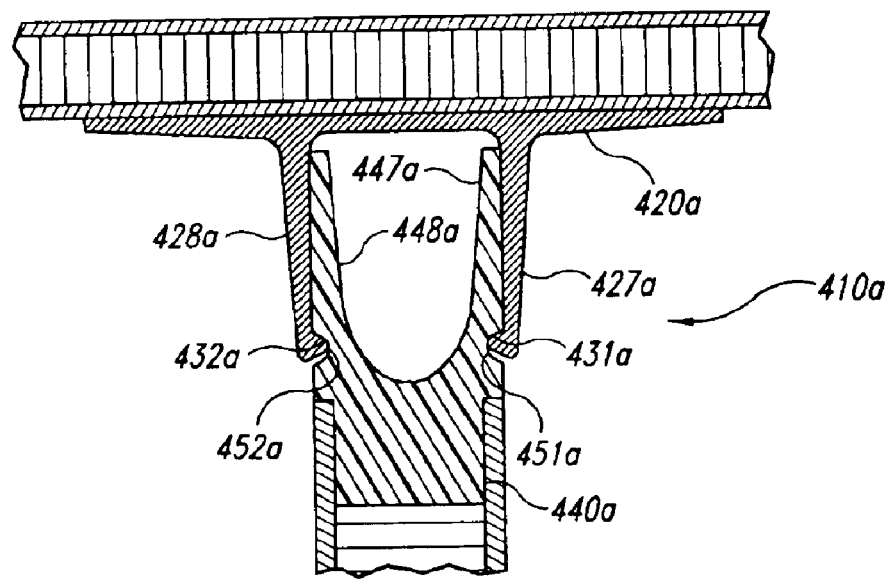
FIGS. 4A–C are cross-sectional views of joining apparatuses having first and second parts with recess and protuberance configurations in accordance with other embodiments of the invention.
Figure 4B:
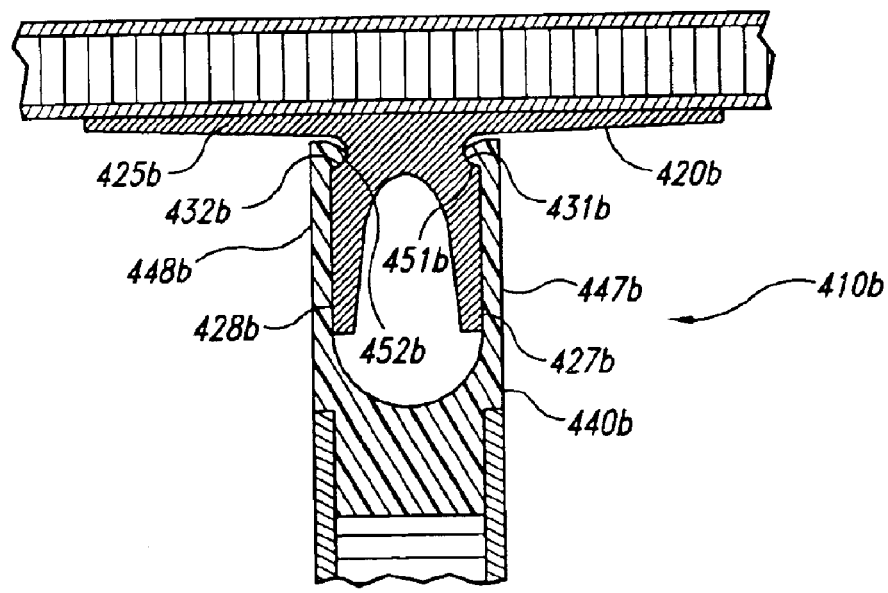
Figure 4C:
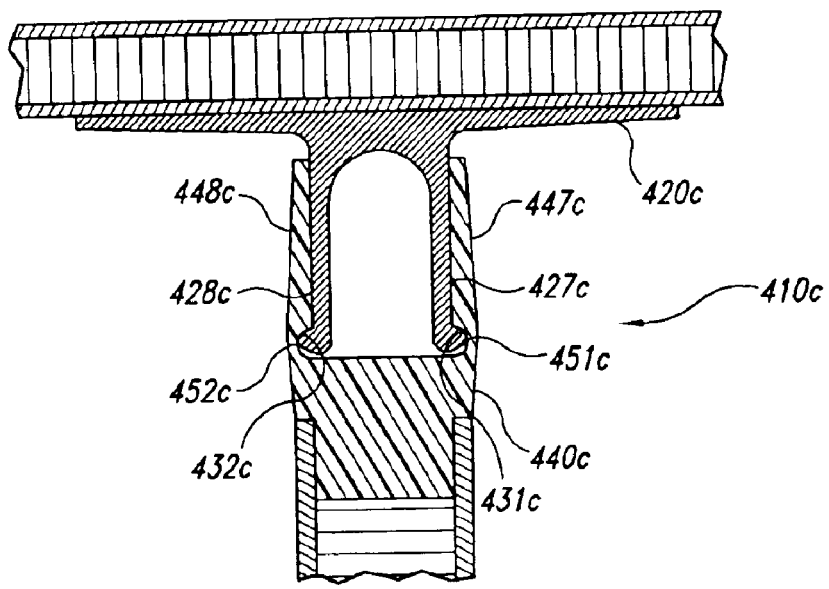

FIGS. 4A–C are cross-sectional views of joining apparatuses 410a–c having first parts 420a–c and second parts 440a–c with recess and protuberance configurations in accordance with other embodiments of the invention. In FIG. 4A, the first part 420a includes a first flange portion 427a and a second flange portion 428a. In one aspect of this embodiment, first and second protuberances 431a and 432a extend inwardly from distal ends of the first and second flange portions 427a and 428a, respectively. In another aspect of this embodiment, the second part 440a includes third and fourth flange portions 447a and 448a. The third flange portion 447a can include a first second 451a configured to receive the first protuberance 431a, and the fourth flange portion 448a can include a second recess 452a configured to receive the second protuberance 432a, when the first part 420a is fully engaged with the second part 440a. The second part 440a can be bonded to the first part 420a with adhesive (not shown) applied to the inner sides of the first and second flange portions 427a and 428a prior to engaging the second part 440a with the first part 420a.

In FIG. 4B, the first part 420b includes a base portion 425b and first and second flange portions 427b and 428b. In one aspect of this embodiment, a first recess 431b is positioned between the first flange portion 427b and the base portion 425b, and a second recess 423b is positioned between the second flange portion 428b and the base portion 425b. In another aspect of this embodiment, the second part 440b includes third and fourth flange portions 447b and 448b. First and second protuberances 451b and 452b extend inwardly from distal ends of the third and fourth flange portions 447b and 448b. The first protuberance 451b can be configured to be received in the first recess 431b, and the second protuberance 452b can be configured to be received in the second recess 432b, when the second part 440b is engaged with the first part 420b. The second part 440b can be bonded to the first part 420b with adhesive (not shown) applied to the inner sides of the third and fourth flange portions 447b and 448b prior to engaging the second part 440b with the first part 420b.

In FIG. 4C, the first part 420c includes a first flange portion 427c and a second flange portion 428c. In one aspect of this embodiment, first and second protuberances 431c and 432c extend outwardly from distal ends of the first and second flange portions 427c and 428c, respectively. In another aspect of this embodiment, the second part 440c includes third and fourth flange portions 447c and 448c. A first recess 431c can be positioned adjacent to the third flange portions 447c and configured to receive the first protuberance 451c when the second part 440c is fully engaged with the first part 420c. Similarly, a second recess 432c can be positioned adjacent to the fourth flange portion 448c and configured to receive the second protuberance 452c when the second part 440c is fully engaged with the first part 420c. The second part 440c can be bonded to the first part 420c with adhesive (not shown) applied to the outer sides of the first and second flange portions 427c and 428c prior to engaging the second part 440c with the first part 420c.

The joining apparatuses 410a–c described above with reference to FIGS. 4A–C are merely representative of the many configurations possible in accordance with the present invention. Accordingly, those of ordinary skill in the relevant art will appreciate that numerous other configurations are possible without departing from the spirit or scope of the present invention. For example, in other embodiments the respective arrangements of the flange portions 427a–c, 428a–c, 447a–c and 448a–c, as well as the respective arrangements of the first and second recesses 431a–c and 432a–c, and the first and second protuberances 451a–c and 452a–c, may be different than those described above.

Figure 5:
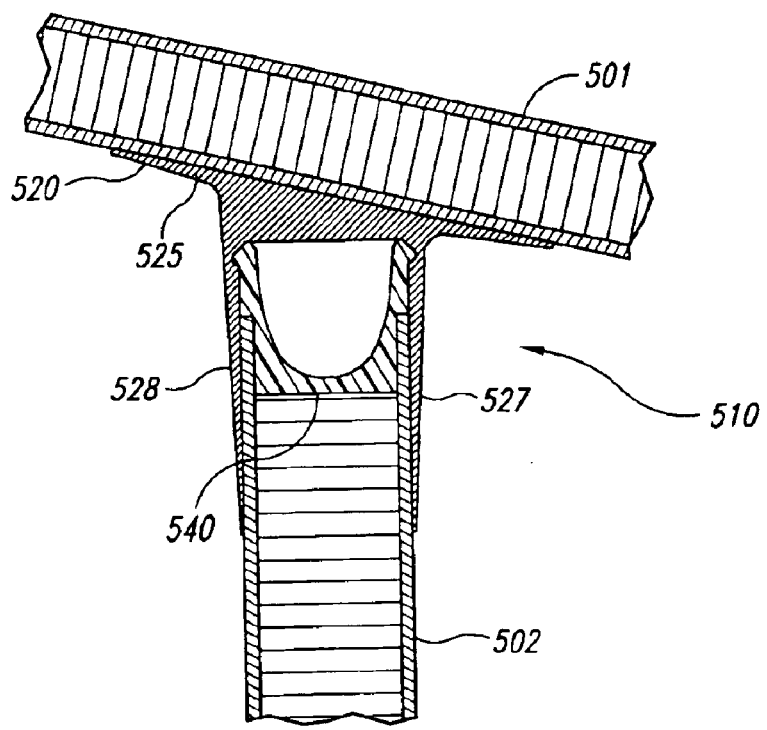
FIG. 5 is a cross-sectional view of a joining apparatus for joining a first member to a second member at a non-right angle in accordance with an embodiment of the invention.

FIG. 5 is a cross-sectional view of a joining apparatus 510 for joining a first member 501 to a second member 502 at a non-right angle in accordance with an embodiment of the invention. In one aspect of this embodiment, the joining apparatus 510 includes a first part 520 and a second part 540. The first part 520 includes a base portion 525 and first and second flange portions 527 and 528. The base portion 525 is configured to be bonded to the first member 501, and the first and second flange portions 527 and 528 project from the base portion 525 at angles of from about 60 degrees to about 85 degrees. In other embodiments, the first and second flange portions 527 and 528 can project from the base portion 525 at angles of from about 30 degrees to about 85 degrees. In yet other embodiments, the first and second flange portions can project from the base portion 525 at other non-right angles. In another aspect of this embodiment, the second part 540 is configured to be bonded to the second member 502 and engaged with and bonded to the first part 520 in a manner at least approximately the same as that described above for the second part 240 shown in FIGS. 2–3B. In other embodiments, the first and second parts 520 and 540 can have other recess and protuberance configurations, such as those described above with reference to FIGS. 4A–4C.

FIGS. 6A–D are cross-sectional views of joining apparatuses 610a–d for joining first members 601a–c to a plurality of other members at a common joint in accordance with embodiments of the invention. In all the embodiments illustrated in FIGS. 6A–D, a single recess and protuberance configuration of the respective parts is shown for purposes of illustration. As will be understood by those of ordinary skill in the relevant art, however, any of the recess and protuberance configurations described above with reference to FIGS. 2–4C may be included in the arrangements shown in FIGS. 6A–D in accordance with other embodiments of the present invention.

Figure 6A:
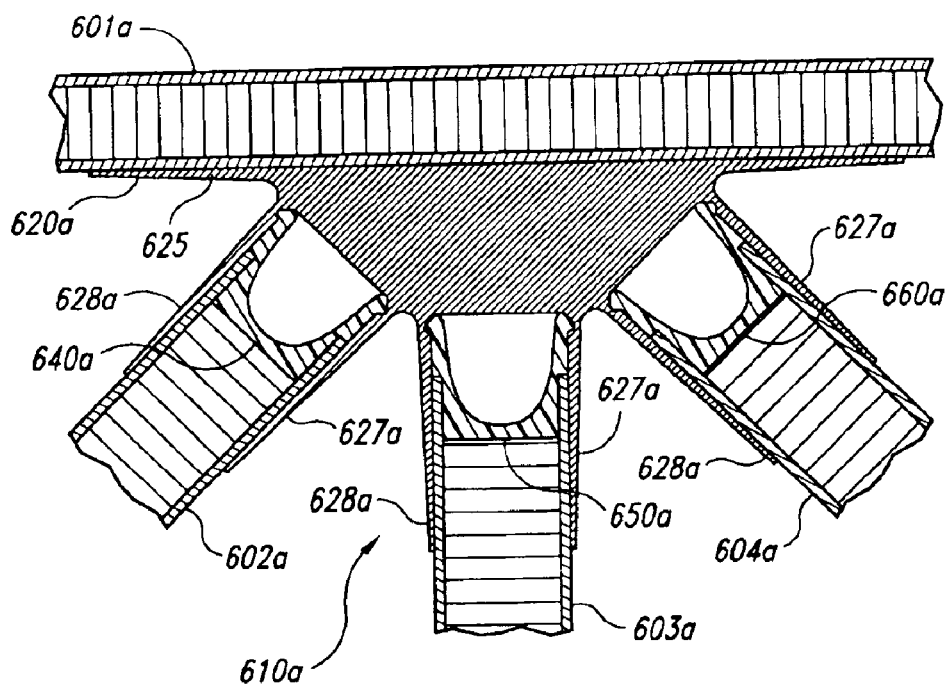
FIGS. 6A–D are cross-sectional views of joining apparatuses for joining first members to a plurality of other members at a common joint in accordance with embodiments of the invention.

In FIG. 6A, the joining apparatus 610a includes a first part 620a, a second part 640a, a third part 650a, and a fourth part 660a. In one aspect of this embodiment, the first part 620a includes a base portion 625 and three sets of associated flange portions 627a and 628a. The base portion 625 is configured to be bonded to the first member 601a, and each set of the associated flange portions 627a and 628a is configured to engage a corresponding one of the second part 640a, the third part 650a, and the fourth part 660a. In another aspect of this embodiment, the second part 640a is configured to be bonded to a second member 602a, the third part 650a is configured to be bonded to a third member 603a, and the fourth part 660a is configured to be bonded to a fourth member 604a. Accordingly, each of the second part 640a, the third part 650a, and the fourth part 660a can be engaged with the first part 620a for bonding the second member 602a, the third member 603a, and the fourth member 604a to the first part 620a, thereby joining the second member 602a, the third member 603a, and the fourth member 604a to the first member 601a at a common joint.

Figure 6B:
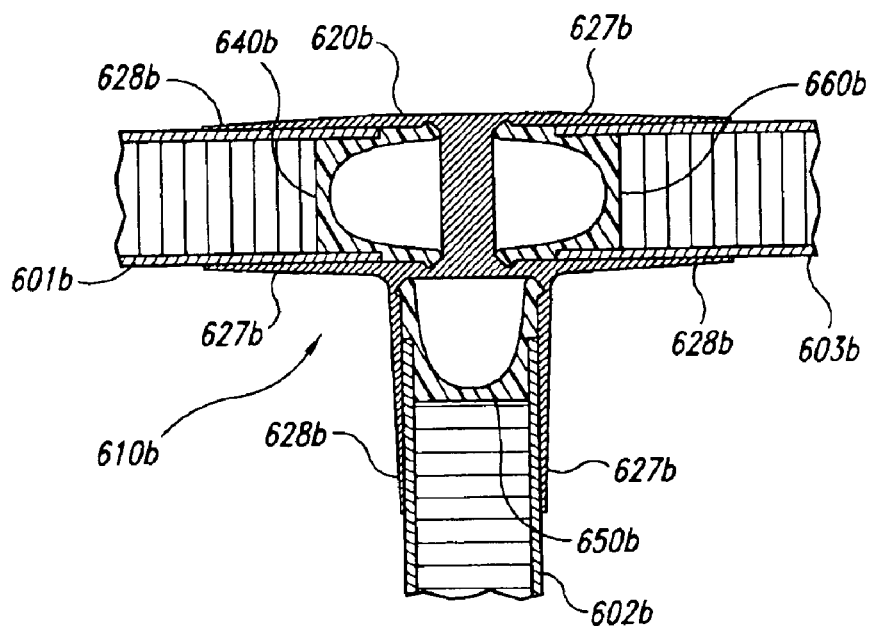

In FIG. 6B, the joining apparatus 610b includes a first part 620b, a second part 640b, a third part 650b, and a fourth part 660b. In one aspect of this embodiment, the first part 620b includes three sets of associated flange portions 627b and 628b with each set configured to engage a corresponding one of the second part 640b, the third part 650b, and the fourth part 660b. In another aspect of this embodiment, the second part 640b is configured to be bonded to a first member 601b, the third part 650b is configured to be bonded to a second member 602b, and the fourth part 660b is configured to be bonded to a third member 603a. Accordingly, each of the second part 640b, the third part 650b, and the fourth part 660b can be engaged with the first part 620b for bonding the first member 601b, the second member 602b, and the third member 603b to the first part 620b, thereby joining the first member 601b, the second member 602b, and the third member 603b together at a common joint.

Figure 6C:
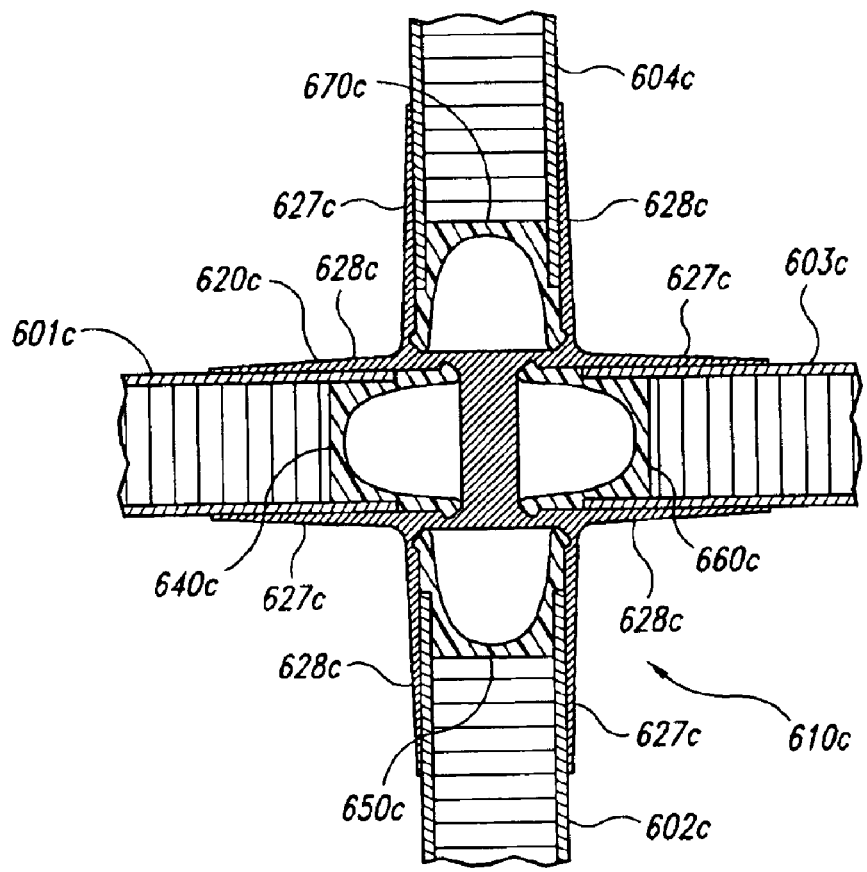

In FIG. 6C, the joining apparatus 610c includes a first part 620c, a second part 640c, a third part 650c, a fourth part 660c, and a fifth part 670c. In one aspect of this embodiment, the first part 620c includes four sets of associated flange portions 627c and 628c, with each set configured to engage a corresponding one of the second part 640c, the third part 650c, the fourth part 660c, and the fifth part 670c. In another aspect of this embodiment, the second part 640c is configured to be bonded to a first member 601c, the third part 650c is configured to be bonded to a second member 602b, the fourth part 660c is configured to be bonded to a third member 603c, and the fifth part 670c is configured to be bonded to a fourth member 604c. Accordingly, each of the second part 640c, the third part 650c, the fourth part 660c, and the fifth part 670c can be engaged with the first part 620c for bonding the first member 601c, the second member 602c, the third member 603c, and the fourth member 604c to the first part 620c, thereby joining the first member 601c, the second member 602c, the third member 603c, and the fourth member 604c together at a common joint.

Figure 6D:
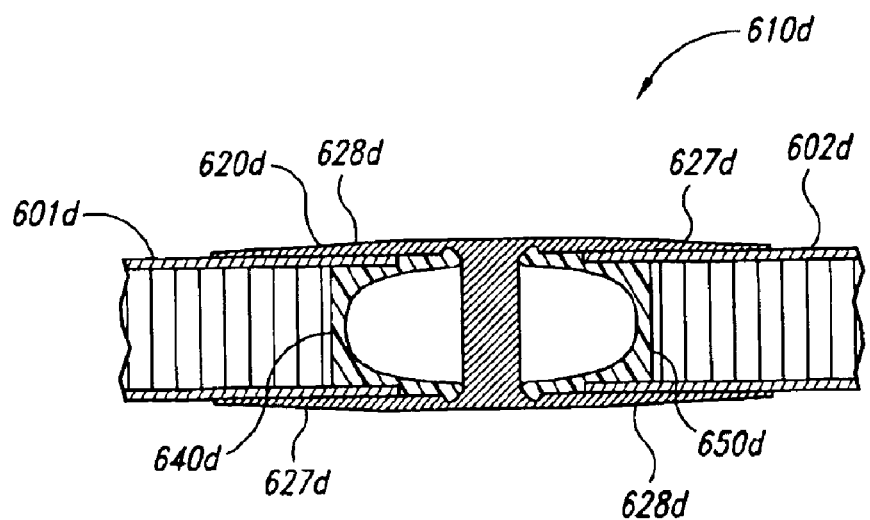

In FIG. 6D, the joining apparatus 610d includes a first part 620d, a second part 640d, and a third part 650d. In one aspect of this embodiment, the first part 620d includes two sets of associated flange portions 627d and 628d with each set configured to engage a corresponding one of the second part 640d and the third part 650d. In another aspect of this embodiment, the second part 640d is configured to be bonded to a first member 601d, and the third part 650d is configured to be bonded to a second member 602d. Accordingly, each of the second part 640d and the third part 650d can be engaged with the first part 620d for bonding the first member 601d and the second member 602d to the first part 620d, thereby joining the first member 601d and the second member 602d together at a common joint, such as a panel splice.

The joining apparatuses 610a–d described above with reference to FIGS. 6A–D are merely representative of the many configurations possible in accordance with embodiments of the present invention. Accordingly, in other embodiments various aspects of the joining apparatuses 610a–d can be combined or omitted to create other useful configurations without departing from the spirit or scope of the present invention.

Figure 7:
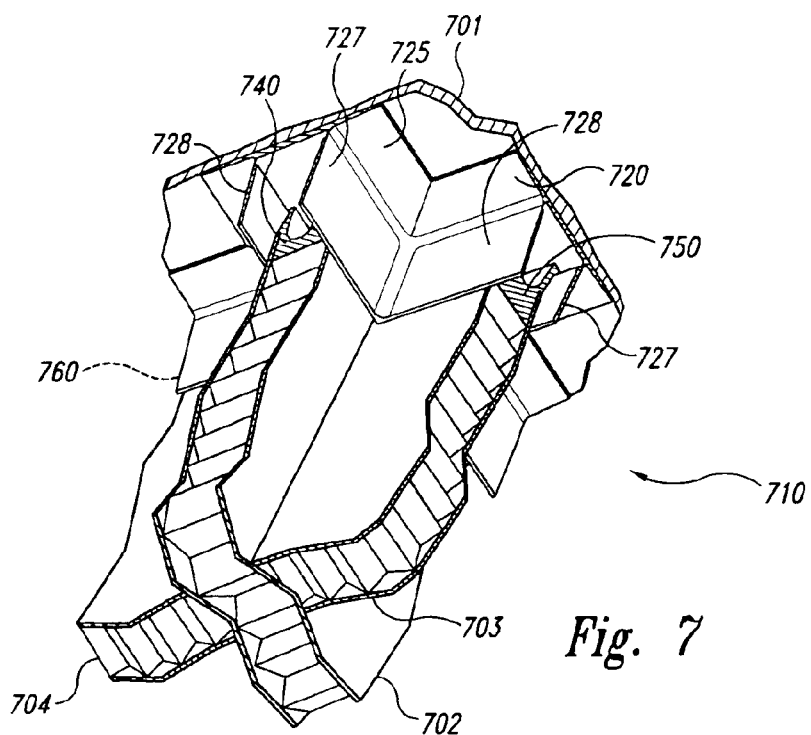
FIG. 7 is a partially hidden, cut-away isometric view of a joining apparatus for joining a first member to intersecting second, third, and fourth members in accordance with an embodiment of the invention.

FIG. 7 is a partially hidden, cut-away isometric view of a joining apparatus 710 for joining a first member 701 to intersecting second, third, and fourth members 702, 703 and 704, respectively, in accordance with an embodiment of the invention. In one aspect of this embodiment, the joining apparatus 710 includes a first part 720, a second part 740, a third part 750, and a fourth part 760. In another aspect of this embodiment, the first part 720 includes a base portion 725 and four sets of associated flange portions 727 and 728 arranged in a cross-pattern relative to the base portion 725. The base portion 725 is configured to be bonded to the first member 701, and two of the aligned sets of associated flange portions 727 and 728 are configured to engage the second part 740. In addition, each of the other two sets of associated flange portions 727 and 728 is configured to engage one of the third part 750 and the fourth part 760. In yet another aspect of this embodiment, the second part 740 is configured to be bonded to the second member 702, the third part 750 is configured to be bonded to the third member 703, and the fourth part 760 is configured to be bonded to the fourth member 704. Accordingly, each of the second part 740, the third part 750, and the fourth part 760 can be engaged with and bonded to the first part 720 in a manner at least approximately the same as that described above in reference to FIGS. 2–3B to join the first member 701 to the intersecting second, third, and fourth members 702, 703 and 704.

Figure 8:
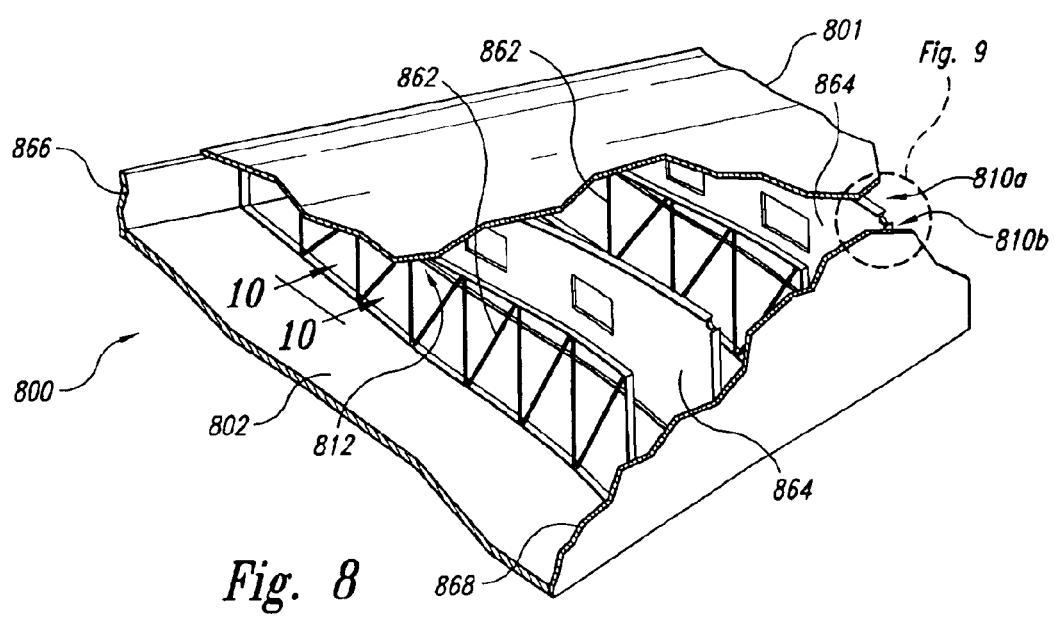
FIG. 8 is a cut-away isometric view of an aircraft wing structure having a plurality of panel joining apparatuses and truss joining apparatuses in accordance with an embodiment of the invention.

FIG. 8 is a cut-away isometric view of an aircraft wing structure 800 having a plurality of panel joining apparatuses 810a–b and truss joining apparatuses 812 in accordance with an embodiment of the invention. In one aspect of this embodiment, the aircraft wing structure 800 includes a plurality of truss ribs 862 and fuel baffle ribs 864 extending fore and aft between an aft wing spar 866 and a forward wing spar 868. A lower wing skin 802 is joined to lower portions of the truss ribs 862 and the fuel baffle ribs 864 between the fore and aft wing spars 868 and 866. Similarly, an upper wing skin 801 is bonded to upper portions of the truss ribs 862 and the fuel baffle ribs 864 between the forward and aft wing spars 868 and 866.

Figure 9:
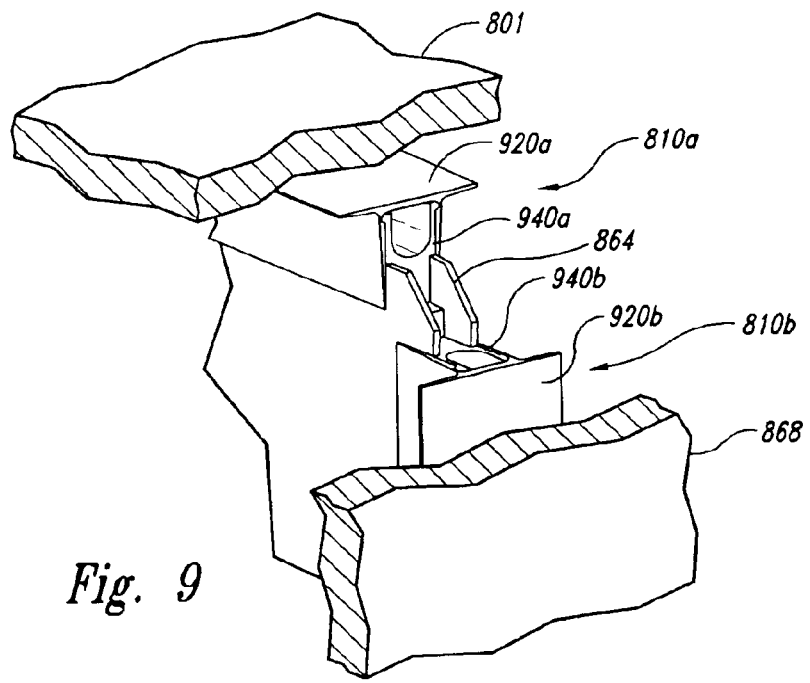
FIG. 9 is an enlarged cut-away isometric view taken from FIG. 8 for the purpose of illustrating a method for joining a fuel baffle rib to an upper wing skin and a forward wing spar in accordance with an embodiment of the invention.

FIG. 9 is an enlarged cut-away isometric view taken from FIG. 8 and illustrating a method for joining one of the fuel baffle ribs 864 to the upper wing skin 801 and the forward wing spar 868 in accordance with an embodiment of the invention. In one aspect of this embodiment, the panel joining apparatus 810a joins an upper portion of a the fuel baffle rib 864 to the upper wing skin 801, and the panel joining apparatus 810b joins a forward portion of the fuel baffle rib 864 to the forward wing spar 868. The panel joining apparatus 810a includes a first part 920a and a second part 940a, and the panel joining apparatus 810b similarly includes a first part 920b and a second part 940b.

In a further aspect of this embodiment, the fuel baffle rib 864 can be joined to the upper wing skin 801 and the forward wing spar 868 by first bonding suitable lengths of the second parts 940a and 940b around the upper and forward edges, respectively, of the fuel baffle rib 864. This may require routing core material out of portions of the edges of the fuel baffle rib 864 to create a groove to receive the lengths of the second parts 940a and 940b. Next, suitable lengths of the first parts 920a and 920b are bonded to the upper wing skin 801 and the forward wing spar 868, respectively, at the appropriate location for the fuel baffle rib 864. The second part 940b on the forward portion of the fuel baffle rib 864 can then be engaged with and bonded to the first part 920b on the forward wing spar 868 to join the fuel baffle rib 864 to the forward wing spar 868. Similarly, the first part 920a on the upper wing skin 801 can then be engaged with and bonded to the second part 940a on the upper portion of the fuel baffle rib 864 to join the upper wing skin 801 to the fuel baffle rib 864. As will be appreciated by those of ordinary skill in the relevant art, the foregoing assembly sequence or method represents but one possible approach for joining the fuel baffle rib 864 to the upper wing skin 801 and the forward wing spar 868. In other embodiments, other sequences and/or methods can be used to produce the same or similar structures.

Figure 10:
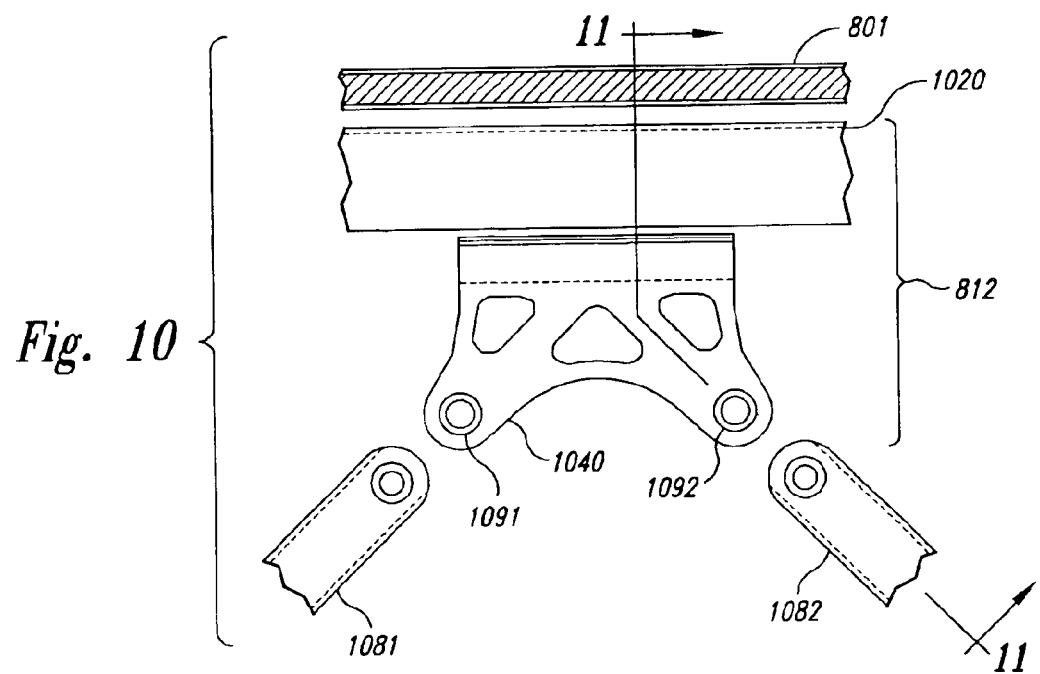
FIG. 10 is an exploded side elevational view of a truss joining apparatus in accordance with an embodiment of the invention taken along line 10—10 of FIG. 8.

FIG. 10 is an exploded side elevational view of the truss joining apparatus 812 in accordance with an embodiment of the invention taken along line 10—10 in FIG. 8. In one aspect of this embodiment, the truss joining apparatus 812 includes a first part 1020 configured to be bonded to the upper wing skin 801, and a second part 1040 configured to be engaged with and bonded to the first part 1020. In another aspect of this embodiment, the second part 1040 includes a first aperture 1091 configured to receive a first fastener (not shown) for attaching a first truss element 1081 to the second part 1040, and a second aperture 1092 configured to receive a second fastener (not shown) for attaching a second truss element 1082 to the second part 1040. In other embodiments, the second part 1040 can include more or fewer apertures for attaching more or fewer truss elements or other members to the second part 1040.

Figure 11:
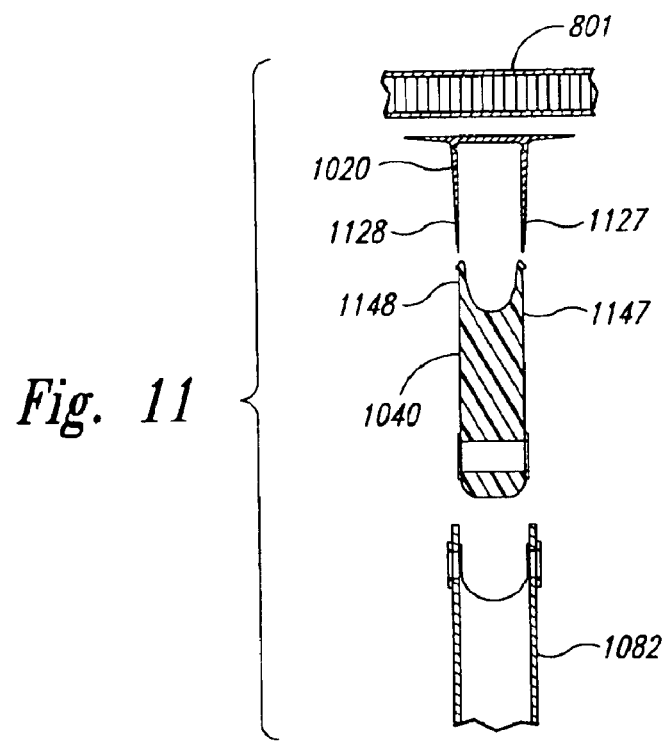
FIG. 11 is a cross-sectional end view of the truss joining apparatus of FIG. 10 in accordance with an embodiment of the invention taken substantially along line 11—11 of FIG. 10.

FIG. 11 is a cross-sectional end view of the truss joining apparatus 812 of FIG. 10 in accordance with an embodiment of the invention taken substantially along line 11—11 in FIG. 10. In one aspect of this embodiment, the first part 1020 includes first and second flange portions 1127 and 1128 that are at least generally similar to the first and second flange portions 227 and 228 of the first part 220 illustrated in the FIG. 2. In another aspect of this embodiment, the second part 1040 includes third and fourth flange portions 1147 and 1148 that are at least generally similar to the third and fourth flange portions 247 and 248 of the second part 240 illustrated in FIG. 2. Accordingly, the second part 1040 can be engaged with and bonded to the first part 1020 in a manner that is at least generally similar to that described above in reference to FIGS. 3A and 3B. In addition, those of ordinary skill in the relevant art will appreciate that in other embodiments other configurations for the first part 1020 and the second part 1040 can be used, such as the configurations shown if FIGS. 4A–C.

Figure 12:
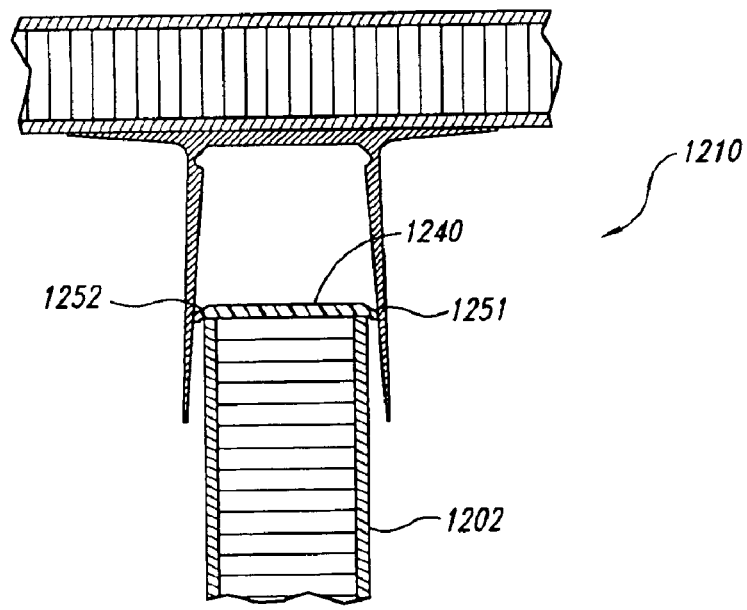
FIG. 12 is a cross-sectional view of a joining apparatus in a partially engaged position in accordance with another embodiment of the invention.

FIG. 12 is a cross-sectional view of a joining apparatus 1210 in a partially engaged position in accordance with another embodiment of the invention. In one aspect of this embodiment, the joining apparatus 1210 can be at least similar in structure and function to the joining apparatus 210 described above in reference to FIGS. 2–3B. In a further aspect of this embodiment, however, the joining apparatus 1210 includes a second part 1240 providing first and second protuberances 1251 and 1252. The second part 1240 can be bonded directly to a second member 1202 without having to rout or otherwise substantially prepare the edge of the second member 1202. Accordingly, the second part 1240 may be simpler to manufacture and/or use than the second part 240 described above in reference to FIGS. 2–3B.

In another embodiment that is similar to that illustrated in FIG. 12, the second part 1240 can be omitted and instead the first and second protuberances 1251 and 1252 can be integral features of the second member 1202. For example, in one aspect of this embodiment, the first and second protuberances can be provided on the second member 1202 by manufacturing them on the appropriate edges of the facesheets of the second member 1202. In another aspect of this embodiment, the first and second protuberances can be provided on the second member 1202 by forming them with a suitable material, such as an epoxy adhesive. In yet other embodiments, other methods can be employed to provide the expanding and engaging features of the first and second protuberances 1251 and 1252 without departing from the spirit or scope of the present invention.

From the foregoing, it will be appreciated that specific embodiments of the invention have been described herein for purposes of illustration, but that various modifications may be made without deviating from the spirit and scope of the invention. For example, while apparatuses and methods in accordance with several embodiments of the invention have been shown and described in the context of aircraft components, the same and/or generally similar apparatuses and methods can be used in other contexts, such as in the manufacture of boats, automobiles or any other context in which components are adhesively or otherwise attached. Accordingly, the invention is not limited except as by the appended claims.

We claim:

1. An apparatus comprising:
   a first aircraft member;
   a second aircraft member;
   a first part attached to the first aircraft member, the first part having at least two sets of associated flange portions, wherein each set of associated flange portions has a first surface facing a first direction and a second surface facing a second direction different than the first direction, each set of associated flange portions further having a first recess at least proximate to the first surface and a second recess at least proximate to the second surface; and
   at least a second part attached to the second aircraft member, the second part configured to be engaged with one of the sets of associated flange portions of the first part, the second part having a third surface facing a third direction and a fourth surface facing a fourth direction different than the third direction, the second part further having a first protuberance at least proximate to the third surface and a second protuberance at least proximate to the fourth surface, wherein the first protuberance is configured to be received by the first recess of the one set of associated flange portions, and the second protuberance is configured to be received by the second recess of the one set of associated flange portions, and wherein the third and fourth surfaces of the second part are configured to receive adhesive for bonding the second part to the one set of associated flange portions of the first part.

2. The apparatus of claim 1 wherein the first part includes a base portion with at least a fifth surface attached to the first aircraft member, and wherein the second part includes at least a sixth surface attached to the second aircraft member.

3. The apparatus of claim 1 wherein the first part includes a base portion with at least a fifth surface bonded to the first aircraft member, and wherein the second part includes at least a sixth surface bonded to the second member.

4. The apparatus of claim 1 wherein the first part includes a base portion with at least a fifth surface configured for attachment to the first member, and wherein the second part includes an aperture configured to receive a fastener for attaching the second member to the second part.

5. The apparatus of claim 1 wherein the first part includes a base portion with at least a fifth surface attached to the first aircraft member, wherein the first and second surfaces are positioned at angles of from about 85 degrees to about 90 degrees relative to the fifth surface, and wherein the second part includes at least a sixth surface attached to the second aircraft member, the sixth surface being at least generally parallel to the third and fourth surfaces.

6. The apparatus of claim 1 wherein the first part includes a base portion, and wherein the first recess is positioned at an intersection between the first surface and the base portion and the second recess is positioned at an intersection between the second surface and the base portion.

7. The apparatus of claim 1 wherein the first part further includes a first base portion attached to the first aircraft member.

8. The apparatus of claim 1 wherein the first part further includes a first base portion configured to be attached to the first aircraft member, and wherein the second part further includes an aperture configured to receive a fastener for attaching the second aircraft member to the second part.

9. The apparatus of claim 1 wherein the first part further includes a first base portion bonded to the first aircraft member, and wherein the second part is bonded to the second aircraft member.

10. The apparatus of claim 1 wherein the first part has two sets of associated flange portions, and wherein the apparatus further comprises a third part configured to be engaged with one of the sets of associated flange portions of the first part, wherein the first part includes a base portion bonding the first part to the first aircraft member, wherein the second part is bonded to the second aircraft member, and wherein the third part is configured to be bonded to a third aircraft member.

11. The apparatus of claim 1 wherein the first part has three sets of associated flange portions, and wherein the apparatus further comprises a third part and a fourth part, wherein each of the second, third and fourth parts are configured to be engaged with one of the sets of associated flange portions of the first part, and wherein the second part is bonded to the second aircraft member, the third part is bonded to a third aircraft member, and the fourth part is configured to be bonded to a fourth aircraft member.

12. The apparatus of claim 1 wherein the first part has four sets of associated flange portions, and wherein the apparatus further comprises a third part, a fourth part, and a fifth part, wherein each of the second, third, fourth, and fifth parts are configured to be engaged with one of the sets of associated flange portions of the first part, and wherein the second part is configured to be bonded to the second aircraft member, the third part is configured to be bonded to a third aircraft member, the fourth part is configured to be bonded to a fourth aircraft member, and the fifth part is configured to be bonded to a fifth aircraft member.

13. The apparatus of claim 1 wherein the first and second surfaces of the first part are elastically moveable relative to each other.

14. The apparatus of claim 1 wherein the first part includes a base portion, and wherein the first recess is positioned at an intersection between the first surface and the base portion and the second recess is positioned at an intersection between the second surface and the base portion.

15. The apparatus of claim 1 wherein each of the flange portions are tapered.

16. An apparatus comprising:
a first aircraft member;
a second aircraft member;
a first part having a first base portion and first and second flange portions projecting from the first base portion, wherein the first flange portion includes a first surface facing a first direction and the second flange portion includes a second surface facing a second direction different than the first direction, the first part further having a first recess at least proximate to the first surface and a second recess at least proximate to the second surface, wherein the first base portion includes a first base surface with adhesive bonding the first part to the first aircraft member; and
a second part configured to be engaged with the first part, the second part having a second base portion and third and fourth flange portions projecting from the second base portion, wherein the third flange portion includes a third surface facing a third direction and the fourth flange portion includes a fourth surface facing a fourth direction different than the third direction, the second part further having a first protuberance at least proximate to the third surface and a second protuberance at least proximate to the fourth surface, wherein the second base portion includes a second base surface with adhesive bonding the second part to the second aircraft member, and wherein the third surface is configured to receive adhesive for bonding the third surface to the first surface, the fourth surface is configured to receive adhesive for bonding the fourth surface to the second surface, the first protuberance is configured to be received by the first recess, and the second protuberance is configured to be received by the second recess when the second part is engaged with the first part.

17. The apparatus of claim 16 wherein the first and second surfaces of the first part are elastically moveable relative to each other.

18. The apparatus of claim 16 wherein the third and fourth surfaces of the second part are elastically moveable relative to each other.

19. The apparatus of claim 16 wherein the first and second surfaces of the first part are elastically moveable relative to each other, and the third and fourth surfaces of the second part are elastically moveable relative to each other.

20. The apparatus of claim 16 wherein the first surface is at least generally parallel to the second surface, and the third surface is at least generally parallel to the fourth surface.

21. The apparatus of claim 16 wherein the first surface is at least generally parallel to the third surface, and the second surface is at least generally parallel to the fourth surface, when the second part is engaged with the first part.

22. The apparatus of claim 16 wherein at least a portion of the third and fourth surfaces of the second part are configured to be positioned between the first and second surfaces of the first part when the second part is engaged with the first part.

23. The apparatus of claim 16 wherein at least a portion of the first and second surfaces of the first part are configured to be positioned between the third and fourth surfaces of the second part when the second part is engaged with the first part.

24. The apparatus of claim 16 wherein the first part has two sets of associated flange portions, wherein the apparatus further comprises a third part configured to be engaged with one of the sets of associated flange portions of the first part, and wherein the third part is configured to be bonded to a third member.

25. The apparatus of claim 16 wherein the first part has three sets of associated flange portions, and wherein the apparatus further comprises a third part and a fourth part, wherein each of the second, third and fourth parts are configured to be engaged with one of the sets of associated flange portions of the first part, and wherein the third part is configured to be bonded to the a third member, and the fourth part is configured to be bonded to a fourth member.

26. The apparatus of claim 16 wherein the first part has four sets of associated flange portions, and wherein the apparatus further comprises a third part, a fourth part, and a fifth part, wherein each of the second, third, fourth, and fifth parts are configured to be engaged with one of the sets of associated flange portions of the first part, and wherein the third part is configured to be bonded to a third member, the fourth part is configured to be bonded to a fourth member, and the fifth part is configured to be bonded to a fifth member.

27. The apparatus of claim 16 wherein the first protuberance is positioned on a distal end of the third flange portion and the second protuberance is positioned on a distal end of the fourth flange portion.

28. The apparatus of claim 16 wherein the first recess is positioned at an intersection between the first surface and the first base portion and the second recess is positioned at an intersection between the second surface and the first base portion, wherein the first protuberance is positioned on a distal end of the third flange portion and the second protuberance is positioned on a distal end of the fourth flange portion, and wherein at least a portion of the third and fourth surfaces of the second part are configured to be positioned between the first and second surfaces of the first part when the second part is engaged with the first part.

29. The apparatus of claim 16 wherein the first recess is positioned at an intersection between the first surface and the first base portion and the second recess is positioned at an intersection between the second surface and the first base portion, wherein the first protuberance is positioned on a distal end of the third flange portion and the second protuberance is positioned on a distal end of the fourth flange portion, and wherein at least a portion of the first and second surfaces of the first part are configured to be positioned between the third and fourth surfaces of the second part when the second part is engaged with the first part.

30. The apparatus of claim 16 wherein the first and second surfaces are positioned at angles of from about 30 degrees to about 85 degrees relative to the first base surface.

31. The apparatus of claim 16 wherein the first and second surfaces are positioned at angles of from about 60 degrees to about 85 degrees relative to the first base surface.

32. The apparatus of claim 16 wherein the first and second surfaces are positioned at angles of from about 85 degrees to about 90 degrees relative to the first base surface.

33. The apparatus of claim 16 wherein at least a portion of the first and second surfaces of the first part are configured to sandwich at least a portion of the second aircraft member.

* * * * *